United States Patent
Thoms

(10) Patent No.: US 9,850,921 B2
(45) Date of Patent: Dec. 26, 2017

(54) CONTROL DEVICE FOR HYDROSTATIC DRIVES

(71) Applicant: Reinhardt Thoms, Holzbunge (DE)

(72) Inventor: Reinhardt Thoms, Holzbunge (DE)

(73) Assignee: SAUER-DANFOSS GmbH & CO. OHG, Neumunster (DE)

( * ) Notice: Subject to any disclaimer, the term of this patent is extended or adjusted under 35 U.S.C. 154(b) by 408 days.

(21) Appl. No.: 13/955,741

(22) Filed: Jul. 31, 2013

(65) Prior Publication Data
US 2014/0033696 A1   Feb. 6, 2014

(30) Foreign Application Priority Data

Aug. 1, 2012  (DE) .................. 10 2012 213 585

(51) Int. Cl.
| | | |
|---|---|---|
| *F15B 15/00* | (2006.01) | |
| *F04B 1/26* | (2006.01) | |
| *F04B 49/22* | (2006.01) | |
| *F04B 53/10* | (2006.01) | |

(52) U.S. Cl.
CPC ............. *F15B 15/00* (2013.01); *F04B 49/22* (2013.01); *F04B 53/10* (2013.01)

(58) Field of Classification Search
CPC .... F15B 2211/20553; F15B 2211/6054; F15B 2211/6057
USPC .......................... 91/12.2, 13; 417/222.1, 269
See application file for complete search history.

(56) References Cited

U.S. PATENT DOCUMENTS

| | | | | |
|---|---|---|---|---|
| 5,184,466 A | * | 2/1993 | Schniederjan | ........ F16H 61/421 60/448 |
| 6,314,729 B1 | * | 11/2001 | Crull | ........ F01P 7/044 60/452 |
| 7,395,664 B2 | * | 7/2008 | Brockmann | ........ F15B 11/162 60/422 |
| 7,562,525 B2 | * | 7/2009 | Brockmann | ........ F15B 11/162 60/422 |

(Continued)

FOREIGN PATENT DOCUMENTS

DE         102010009975 A1      9/2011

OTHER PUBLICATIONS

Machine Translation of DE 102010009975 (Description, German to English by EPO and Google. <retrieved Aug. 25, 2016> <URL: https://worldwide.espacenet.com>).*

*Primary Examiner* — Michael Leslie
*Assistant Examiner* — Richard Drake
(74) *Attorney, Agent, or Firm* — Zarley Law Firm, P.L.C.

(57) ABSTRACT

The invention concerns a hydrostatic drive with a closed hydraulic fluid circuit comprising a hydraulic motor and a variable displacement pump. A feed pump feeds hydraulic fluid under pressure. A control device regulates pressure to a double-sided servo control unit comprising a control piston in a double-sided control cylinder so that the control piston can open a feed line for hydraulic fluid to one side while opening a discharge line on the other. The control device comprises an actuator at the cylinder by means of which force can be exerted onto the piston. A preload element exerts force onto the piston. The pressure generated by the variable displacement pump returns via a return line such that force is exerted in the direction of the piston, if inactive, the piston is maintained by the preload element and the pressure of the variable displacement pump.

17 Claims, 4 Drawing Sheets

(56) References Cited

U.S. PATENT DOCUMENTS

| | | | |
|---|---|---|---|
| 7,895,834 B2* | 3/2011 | Sakamoto | B60K 17/10 60/452 |
| 8,562,307 B2* | 10/2013 | Shimazaki | F04B 49/002 417/212 |
| 8,939,731 B2* | 1/2015 | Zhou | F04B 49/002 417/38 |
| 2009/0107132 A1* | 4/2009 | Esders | F15B 11/162 60/420 |

* cited by examiner

CONTROL DEVICE FOR HYDROSTATIC DRIVES

BACKGROUND OF THE INVENTION

The invention concerns hydrostatic drives with a closed hydraulic circuit consisting of at least one hydraulic motor and one variable displacement pump. In particular, the invention concerns a control device for the controlled pressurization of a servo control unit for a variable displacement pump within a hydraulic circuit. The servo control unit of the variable displacement pump is preferably double-sided, while the variable displacement pump is preferably reversible, though this is not necessary for the inventive concept to be constituted, since the inventive concept can also be realized with a hydraulic pump that is adjustable on one side. The inventive concept applies to all types of hydraulic motors and pumps, in particular axial piston and radial piston types. This includes fixed displacement motors, variable displacement motors and reversible motors of the axial piston or radial piston type, though the inventive concept can be applied to all machines which operate hydrostatically. More broadly speaking, the invention also includes hydrostatic linear drives insofar as these are integrated in a closed hydraulic circuit.

Hydrostatic drives with a closed hydraulic circuit are known from the prior art. They are used for many types of drive systems in mobile and statically positioned machines. For example they are used as propulsion power units for vehicles and/or as ancillary drive units such as fans, generators, cooling units and similar. The inventive concept encompasses all hydraulic drives which comprise at least one hydraulic pump adjustable by servo control and operating within a closed circuit.

Technology always tends towards constantly increasing performance, often combined with the requirement to provide a facility to change the direction of rotation or the direction of the drive. At the same time, the aspect of adapting the performance to actual requirements is becoming increasingly important from the point of view of saving energy. Hydraulic drives are frequently used due to the high levels of efficiency they are capable of achieving and due to their robust and reliable power transmission. Hydraulic drives are also given preference when the area of application involves large fluctuations in temperature and/or large fluctuations are to be expected in power consumption and power delivery. For years, the regulation and control mechanisms and the devices used in this context have proven to be very flexible, fast and highly reliable.

In a closed hydraulic circuit, hydraulic pumps are typically used which demonstrate the same characteristic interrelation between input signal and displacement volume. This is conventionally accomplished by means of servo control devices actuated by control devices which adjust the hydraulic unit by means of deflection elements such as swashplates or bent axes. Here it is usual for the displacement volume of the hydraulic machine to be proportional to the input signal. Adjustable and/or reversible hydraulic drive units with a closed hydraulic driving circuit are used as propulsion power units, for example, with the possibility of moving in both directions. If the input signal fails, the supply pumps are often placed in a zero position in which they do not exhibit any displacement volume, thereby bringing a propulsion power unit to a standstill, for example.

Essentially, servo control devices with a zero position can also be used for drives in which the servo control device is not placed in a zero position if the input signal fails but in a displaced position so that in the case of a fan drive, for example, the fan is still capable of cooling. This is an emergency function, in particular, in the case of electrical failure since control devices for hydraulic drives are often actuated by means of electric proportional magnets A special control device for fan drives in a hydraulic circuit is described in DE 10 2010 009 975 A1. The control device described there ensures, for example, that a fan works at maximum rotational speed if the input signal at the control device fails. In this case, the control piston in the control device, which is guided in a double-sided control cylinder, is shifted into a maximum deflected position against a mechanical fixed stop by means of a spring in case of input signal failure. When it is shifted into a maximum displaced position in the control cylinder, the control piston opens a feed line to a servo control of a variable displacement pump, thereby opening a discharge line for drive fluid on the other side of the control cylinder. The result is that the servo control device is supplied with pressurized drive fluid on one side. In the example selected of a control piston pressurized from one side, the latter and the servo piston hydraulically connected to the control device are deflected to the maximum extent and the fan is powered by an hydraulic motor at maximum drive power. According to the state of the art, a zero-stroke valve limits the hydraulic pressure applied to the hydraulic motor, thereby limiting the maximum rotational speed of the fan.

A proportional magnet can be used to apply an input signal to the control piston in the form of a magnetic force, with the result that the control piston is able to counteract the deflecting force of the spring as the input signal increases, i.e. as the magnetic force increases, thereby shifting the control piston towards neutral position or even to the other side in the control cylinder. When the control piston in the control cylinder is in neutral position, the feed and discharge lines to the servo control device are virtually at equalized pressure. This puts the servo control in a zero position and the hydraulic pump is not deflected, so it does not exhibit a flow rate. If there is no hydraulic flow in the hydraulic pump, the hydraulic motor cannot be powered, which is why the fan logically comes to a standstill.

If the control piston is shifted beyond neutral position by the force of the proportional magnet to the other, second side in the control cylinder, a feed line for drive fluid is opened on the second side of the control cylinder to the servo control device, while at the same time on the first side of the control cylinder, on which the feed line was previously open, a discharge line for drive fluid is opened so that the servo control device can deflect the hydraulic pump to the other side and the direction of flow of the hydraulic fluid in the closed circuit is reversed. Assuming the concept of a fixed displacement motor or a hydraulic motor which is adjustable with variable flow capacity on one side only, the rotational direction of the motor is thus altered, with the result that the rotational direction of the fan can also be reversed. In fans for internal combustion engines in particular, one rotational direction is referred to as the cooling effect of the fan and the reversed rotational direction is referred to as the aeration capacity, by means of which warm air can be blown out of the vehicle or machine into the environment and/or the fan is cleaned, for example.

For it to function as planned, the system described above according to DE 10 2010 009 975 A1 requires pressure relief valves, preferably in the form of zero-stroke valves, which limit the maximum pressure on the respective side in the servo system so that the hydrostatic system is not overloaded. This configuration of pressure relief valves to limit maximum capacity in the feed and discharge lines of the servo device is complex in design and expensive to construct. What is more, pressure relief valves or zero-stroke valves such as these occupy a large amount of installation space in the housing of the variable displacement pump, making it necessary to create a large housing volume. By limiting maximum capacity via pressure relief valves in the servo pressure lines or by means of zero-stroke valves which limit the maximum deflection of the servo control device via the operating pressure (cf. DE 10 2010 009 975 A1), the power supplied to the hydraulic motor of the hydrostatic drive is dependent on the rotational speed of the supply pump. The higher the rotational speed of the supply pump, the higher the displacement volume and supply pressure to be limited by the zero-stroke valves. However, as long as the supply pressure remains below a set limit at which the zero-stroke valves respond, fluctuations in pump output are passed on to the hydraulic motor.

SUMMARY OF THE INVENTION

The object of the present invention is, based on DE 10 2010 009 975 A1, to provide a control device for hydraulic pump servo control devices within a closed hydraulic circuit for hydrostatic drives which ensures that drive power is available when there is no control signal. The drive power to be provided in this way is to be limitable in a simple, inexpensive and space-saving manner so as to avoid overload by means of a control device; what is more, the control device is to maintain the hydrostatic drive power at a constant level in all operating situations, especially when the rotational speed of the variable displacement pump fluctuates. The control signal or input signal for the control device has also to be capable of being used as a reference setting for the drive power.

The object for the control device according to the present invention is that the required/desired drive power/consumer rotational speed is set once and remain constant regardless of the direction of drive or rotation and, in particular in the case of a fan drive, for the fan speed to be maintained at a constant level. Pressure relief valves and/or zero-stroke valves are to be avoided as far as possible.

This object is achieved by means of a hydrostatic drive according to Claim 1, whereby advantageous embodiments are set out in the claims dependent on Claim 1.

In the hydrostatic drive according to the present invention with a control device according to the present invention in a closed hydraulic circuit comprising at least one hydraulic motor—of either fixed displacement or variable displacement type—and one preferably reversible variable displacement pump, the control device is supplied with control pressure by means of pressurized drive fluid supplied by a feed pump, whereby the control device serves the purpose of controlled pressurization of a double-sided servo control unit. When the control unit is in a neutral position, the pressures acting on the double-sided servo control unit are equalized, putting the servo control unit in a zero position in which the servo piston is not deflected. The conventional servo control unit deployed here comprises a double-sided servo piston which can be shifted in two directions in the servo cylinder. By means of an adjustment device—for example a swashplate in the case of an axial piston machine in swashplate design—the hydraulic variable displacement pump can be adjusted for pump performance in both directions.

For this purpose, the control device for controlled pressurization of the double-sided servo control unit comprises a control piston guided for this purpose in a double-sided control cylinder with a first and second side. From a neutral position in which the control piston maintains balanced pressure in the servo lines connected to the servo cylinder, the control piston can be deflected in two directions inside the control cylinder. If the control piston in the control cylinder is deflected in a first direction, it opens a feed line under control pressure for a first side of the servo control device or enlarges the passage for pressurized drive fluid. In this way, the pressureized drive fluid is directed to the first side of the servo control device, causing the servo piston to be shifted inside the servo cylinder. The shifting of the servo piston causes an adjustment element to be deflected to adjust the displacement volume of the hydraulic pump, in turn causing the supply pump to change its displacement volume. Starting from the neutral position of the control piston, therefore, the shifting of the control piston causes the hydraulic pump to be moved from its zero position, in which it does not exhibit any displacement volume, into a position in which it pumps hydraulic fluid. In this way, a hydraulic motor in a closed hydraulic circuit can be powered which, if it is not in zero position, can supply drive power to a consumer. This might take the form of a rotary drive for a fan wheel, for example.

If the drive piston is shifted out of its neutral position, it opens—as described above and rendered in the state of the art—a feed line for drive fluid on one side of the control cylinder to a first side of the double-sided servo control device. At the same time it opens a discharge line for drive fluid on the other, second side of the control cylinder from the other, second side of the servo control device, so that the hydraulic fluid displaced by the servo piston can be discharged. A drive fluid reservoir is available for the discharge of drive fluid which in the simplest case can take the form of a tank. However, the drive fluid can also be discharged into a volume in the inner housing of the variable displacement pump from where it can be taken up by the feed pump which generates the control pressure.

Inside the control device, therefore, there is a control piston which can be shifted on two sides and, depending on whether it is shifted to one or the other side, allows drive fluid under control pressure to be fed to one side of the servo control device while at the same time opening a discharge line to enable discharge of hydraulic fluid from the other servo side on the second side in the control cylinder. For the person skilled in the art this is a common construction of a control device for the controlled application of hydraulic pressure to a double-sided servo control unit so as to achieve deflection or adjustment of a (reversible) hydraulic variable displacement pump. The same or analog principle applies to the adjustment of adjustable and/or reversible hydraulic motors.

An input signal or force is required to deflect the control piston in the control cylinder which shifts the piston in the control cylinder. Based on the state of the art as described at the beginning and assuming that when the control signal fails, the control piston is to be shifted to one side in the control cylinder by means of a preload force, the variable displacement pump is deflected so that power can be supplied by the hydraulic drive even without an input signal. In order not to exceed the maximum threshold of the variable displacement pump, the pressure applied to the servo control device to deflect the variable displacement pump must be limited. This occurs in the state of the art by means of pressure relief valves, in particular zero-stroke valves, which act on the servo control unit in the case of maximum working pressure/operating pressure being exceeded on the high-pressure side in the closed hydraulic circuit such that the deflection of the servo control unit and thus the deflection of the hydrostatic unit is limited, or such that when the pressure is exceeded the deflection is withdrawn. However, this zero-stroke regulation is complex in design and is to be avoided by the invention.

The control piston in the control device is preferably moved into a deflected position in the control cylinder by a preload element so that servo control is deflected via the opened servo pressure line and the hydraulic displacement unit exhibits a displacement volume. It is therefore necessary to limit the amount of pressure supplied to the servo control unit. According to the invention, this is achieved by returning the operating pressure of the high-pressure side, which in the simplest case is equal to the supply pressure of the hydraulic pump in the closed hydraulic circuit, via a return line to a front side of the control piston, preferably to the side opposite to the preload element, so that the operating pressure can exert a force on the control piston which works against the preload element.

In this way, according to the invention, if the control signal is absent and the variable displacement pump is not being powered, the preload element acts against the operating pressure returned to the control device, creating a balance at which the control piston in the control cylinder is deflected and opens a servo pressure line to supply one side of the servo control device with control/feed pressure. At the same time, on the other side of the control cylinder a section of drive fluid is opened from the other side of the servo control so that the servo piston is in a deflected position and the variable displacement pump generates a displacement volume which can be used to power a fan, for example. Here, the level of operating pressure generated by the variable displacement pump depends on the degree of deflection of the control piston in the control cylinder. Without a control signal or input signal, the operating pressure is therefore dependent on the degree of force exerted by the preload element acting on the control piston, with the operating pressure counteracting the force of the preload element and the operating pressure holding the balance.

The operating pressure can preferably be applied directly to a front side of the control piston. In this case, the force acting against the preload element via the front surface of the control piston is derived from the operating pressure for the hydraulic motor. If the operating pressure for driving the variable displacement pump is increased, for example due to an increase in the rotational speed of the combustion engine, the counterforce resulting from the operating pressure applied to the control piston likewise increases, thereby shifting the control piston (back) towards neutral position. In this way, the pressure in the servo pressure line to pressurize the first side of the servo control unit is reduced, since the cross-section for the supply of pressurized hydraulic fluid to the servo piston is diminished. In this way the servo piston is shifted towards zero position by the servo springs commonly arranged on the servo piston, causing the adjustment element (e.g. swashplate) to withdraw the deflection of the displacement unit. This provides a self-regulating hydrostatic control system for hydrostatic drives with a double-sided servo control unit which does without pressure relief valves and zero-stroke valves for maximum power limitation. The system is nonetheless securely protected from overload. The control system according to the invention makes do with a simple pressure return line which conducts the high pressure from the hydrostatic drive circuit to a front side of the control piston.

The control system for hydrostatic drives in a closed hydraulic circuit, according to the invention, is not only self-regulating in terms of the maximum power which the hydrostatic drive can deliver. It is not necessary to impose any regulatory effect on the control piston or the regulating signal set at the control device at any output levels of the hydrostatic drive in order for the hydraulic flow rate arriving at the hydraulic motor to remain constant and in particular for it not to exceed a level set at the control device. In the case of a control signal equal to zero in particular, a predefined constant output level is not exceeded, for example corresponding to an optimum operating point of the hydrostatic drive or to a defined maximum output. This constant level is defined among other things by the amount of preload force acting on the control piston. It is therefore preferable for the amount of preload force to be adjustable, thereby enabling the drive power to be influenced when the control signal is equal to zero.

The preload element, which in the simplest case is a tension or compression spring but which can also be any other mechanically, electrically, pneumatically or indeed hydraulically generated force can be used in particular to define the maximum level of hydrostatic power available at the hydrostatic motor when the control signal is equal to zero.

In normal operating situations, however, it is usually not necessary for the maximum level of hydrostatically generated power to be available. Lower levels of output are generally sufficient to fulfill the overall function of the machine in which the hydrostatic drive is integrated. Assuming a control signal equal to zero at which the drive power provided is at maximum level, the control piston has to be shifted by an actuator towards neutral position in order to reduce the drive power available, which can commonly be achieved by means of a proportional magnet that can be supplied with an electrical voltage. To this end the actuator must generate a force directed against the preload element onto the control piston, the force generated by the actuator being supported by the hydraulic operating pressure or the force resulting from it. So, if a control signal increasing from zero is applied to an actuator to move the control piston, the control piston is initially moved from its deflected position—into which it was moved by the preload element and in which it was held by the force applied by the operating pressure—towards neutral position. This reduces the flow of fluid through the feed line opened by the deflected position of the control piston in the control cylinder. The reduction of control pressure in the feed line to the servo control likewise reduces the pressure on the respective side of the servo piston, causing the servo piston to shift from its deflected position towards the zero position and thus withdrawing the deflection of the hydrostatic unit via the adjustment element.

If the output of the hydraulic drive is reduced by increasing the control signal at an actuator to displace the control piston for as long as it takes to move the control piston into the neutral position, in which the pressure lines from the control device to the servo control device are at equalized pressure, the hydrostatic displacement unit has no flow rate in this neutral position of the control piston. No drive power can be drawn from the hydrostatic motor in this position of the control piston in the control cylinder.

If the control signal is further increased, the control piston is shifted to the second side in the control cylinder. The servo pressure line on the second side of the control cylinder is then supplied with drive fluid under control pressure, causing the pressure to increase on the second servo piston side to be increased and the servo piston to be deflected towards the first side of the servo piston. As a result of the deflection of the servo piston onto the first side in the servo cylinder, the adjustment element is deflected into the opposite direction as compared to the direction described above where the control signal was equal to zero, causing the supply pump to change its direction of flow. When the direction of flow changes, this also changes the direction of flow of the hydraulic fluid driving the hydrostatic motor, so that the latter is also reversible in its direction of rotation. This means that a consumer connected to the hydrostatic motor can be reversed in its direction of drive or operation.

As the strength of the control signal increases, starting from a value of zero, the output of the hydrostatic drive is therefore initially diminished until the control piston has reached neutral position, and subsequently, as the control signal increases further, the control piston is shifted to the second side in the control cylinder so that the power delivery of the hydrostatic drive increases again, though with the hydrostatic circuit now flowing in the reverse direction. As the control signal increases to above the force of the preload element, the reversed output of the hydrostatic drive increases.

The effect of the hydrostatic drive according to the invention is therefore that the control signal is equal to an assigned power output level, enabling the control signal to be used as a reference setting for the power to be supplied. For example, if there is no control signal at the actuator for the control piston, the hydrostatic drive supplies a predefined maximum output in one direction. For every control signal value between zero and the value at which the actuator moved the control piston into neutral position, a value is set for reduced output in the first direction. For a control signal value at which the force exerted by the actuator on the control piston is equal to the force applied by the preload element to the control piston, the hydrostatic power supply is equal to zero, since in this state the control piston is in neutral position. At the same time—with the hydrostatic output equal to zero—there is no operating pressure acting on the front side of the control piston, making it possible to maintain the balanced position by means of a counterforce to the preload element, such as that of a proportional magnet. Of course the force of the preload element can be adjustable, providing additional possibilities for controlled pressurization of the servo control unit.

If the force of the actuator, deriving from the control signal, is greater than the force of the preload element, the control piston is shifted to a second side in the control cylinder in which the sign for hydrostatic power output is reversed—as compared to the state in which the control signal is equal to zero. The further the control piston is shifted onto the second side in the control cylinder, in other words as the control signal increases and the force acting on the actuator to move the control cylinder increases, the hydraulic output in reversed state likewise increases. In this range, the strength of the control signal is thus directly proportional to the reversed hydraulic drive power. Obviously, the amount of drive power in the respective operating state—with the variable displacement pump rotating in a clockwise or anticlockwise direction—can vary in terms of its maximum levels, depending on the application in which the hydrostatic drive according to the invention or the control device according to the invention is deployed.

If the signal strength for generating the actuator force is lower than the force generated by the preload element, the hydrostatic drive power is inversely proportional to the strength of the signal. If the actuator force is greater than the force of the preload element, the hydrostatic drive power is directly proportional to the strength of the signal.

In a further preferred embodiment, the control piston in the double-sided control cylinder on the same side on which the preload element is positioned is hydraulically connected to an additional, second return line which connects the control piston hydraulically either to the servo line on the same side of the control piston or with the low-pressure line of the hydraulic circuit. The connection line between the variable displacement pump and the hydraulic motor, acting as a low-pressure line in normal operation or in the preferred direction of rotation of the variable displacement pump, becomes a high-pressure line during reversed operation. When the variable displacement pump is operating in its preferred direction of rotation, the second return line allows hydraulic fluid with low pressure or control pressure, accumulated by means of an additional throttle if necessary, to be directed to the side of the control piston on which the preload element is exerting force. This achieves a gentler or damped realignment of the displacement mechanism of the hydraulic pump from a deflected position for the preferred rotational direction towards the zero position. If the control piston is moved beyond a neutral position by the force of the actuator, the counterforce generated by the control pressure is generally not sufficient to prevent complete deflection in reversed operation and maintain a balance of forces. This also has to do with the fact that the displacement path of the control piston sufficient to move the adjustment device of the hydraulic pump into a fully deflected position is so short that the spring travel of the preload element only develops a very slight increase in force to counter the force of the actuator.

For reversed operation, therefore, it will be preferable to link the connection line which is under high pressure when the circuit is in reverse operation between the variable displacement pump and the hydraulic motor with the side of the control piston at which the preload element is positioned so that the high pressure can build up a load-dependent counterforce at the control piston to counteract the force of the actuator. This will enable load-dependent control in reversed operation, too, and here, just as in "normal operation", a constant actuator force causes a constant output level at the hydraulic motor, which is automatically regulated to a constant level by means of the high pressure in case of fluctuations in the rotational speed at the variable displacement pump and when the actuator force is maintained at a constant level. For example, an increase in the rotational speed of the variable displacement pump in the return of the connection line acting as a high-pressure line in reversed operation between the hydraulic pump and hydraulic motor on the side of the control piston facing the preload element results in a reduction of the deflection of the hydraulic pump, since the high pressure increases, thereby causing the hydraulic fluid flow rate to decrease and maintaining the hydraulic power available at the hydraulic motor at a constant level.

In the following, the invention will be explained in detailed based on preferred embodiments, though the preferred embodiments described do not limit the range of protection of the invention. The following are shown:

DETAILED DESCRIPTION OF THE PREFERRED EMBODIMENTS

The hydraulic drive according to the invention is illustrated in the following example of a fan drive, whereby, as explained above, the hydraulic drive can also be deployed in a wide range of other applications. The featured example of a fan drive is also described in a preferred exemplary embodiment in conjunction with a combustion engine which powers the hydraulic drive or the hydraulic pump of the hydrostatic drive, though this does not limit the inventive concept.

The chosen example of a fan drive merely services to simplify the description of the inventive idea and is not limited to this embodiment. Electric, pneumatic, mechanical and in particular renewable energy sources can also be used to provide drive power for the hydrostatic drive without deviating from the inventive concept.

Figure 1:
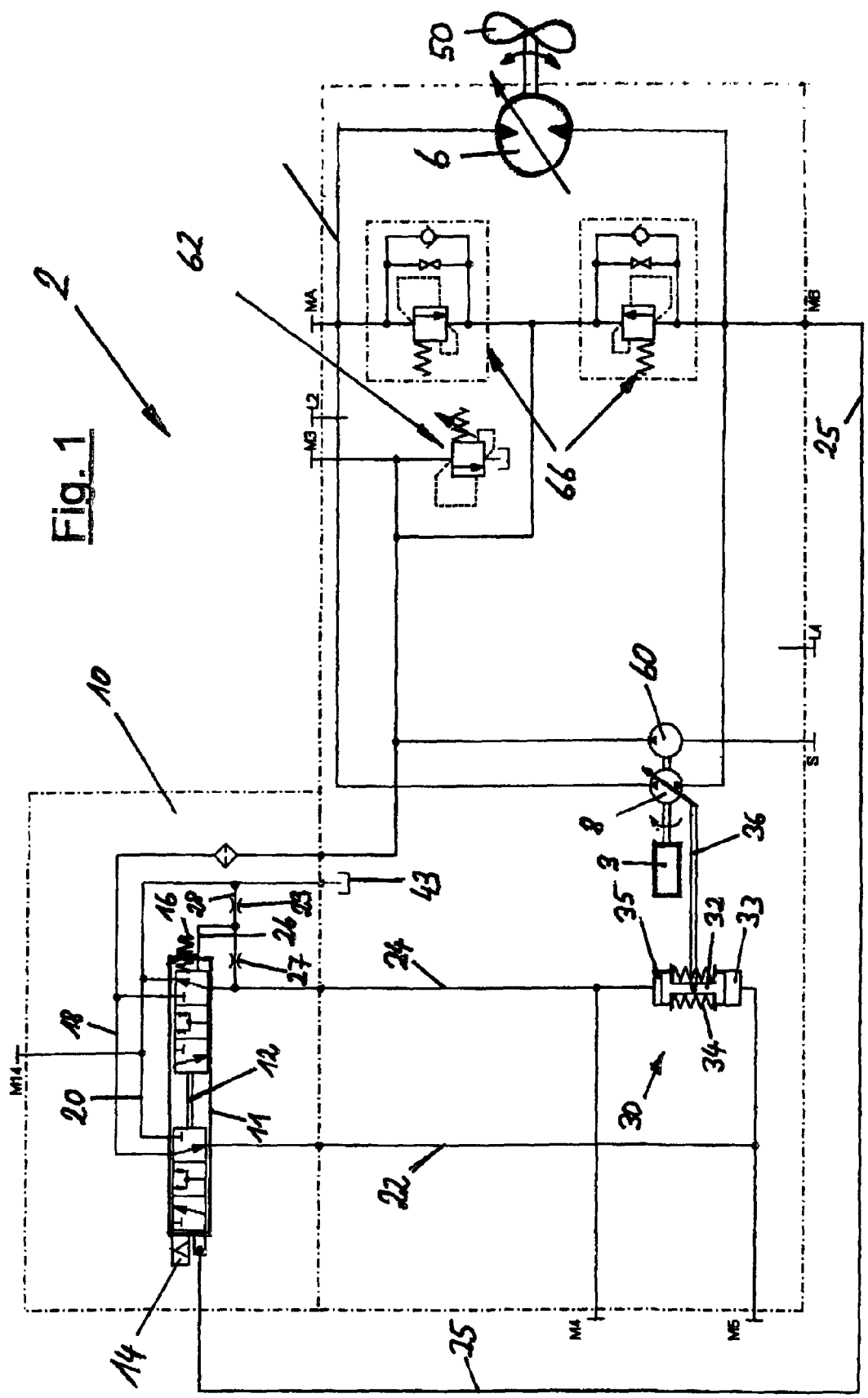
FIG. 1 A first embodiment in diagrammatic form with a control signal equal to zero.

FIG. 1 consists of a hydraulic circuit showing a first embodiment of the invention. The hydrostatic drive 2 in FIG. 1 shows a control device 10 to control a variable displacement pump 8 with a control piston 12 which can be moved along its longitudinal axis in two directions by an actuator 14 and a preload element 16. When the control piston 12 is shifted, feed and discharge lines for hydraulic fluid 18 and 20 are hydraulically alternately connected to a first servo line 22 and a second servo line 24. In the position of the control piston 12 in FIG. 1, the feed line 18 for hydraulic fluid is connected to the servo line 22, meaning that hydraulic fluid under control pressure is fed to a first side 33 of a servo control unit 30. Here the control pressure is generated by a feed pump 60 which pumps drive fluid via line 18 to the control device 10. A second side 35 of the servo control unit 30 is connected via the other side of the control piston 12 with the discharge line 20, which discharges drive fluid into a tank 43, for example.

In the case of the position of the control piston 12 shown in FIG. 1, the first side 33 of the servo control unit 30 is therefore under control pressure, causing the servo piston 32 to be shifted out of the zero position and thereby deflecting the variable displacement pump 8 by means of the deflection device 36. In its deflected position, the variable displacement pump 8 pumps hydraulic fluid to the hydraulic motor 6, which is able to supply drive power to the consumer—in this preferred embodiment a fan 50—insofar as the hydraulic motor 6 is likewise in a deflected position and is able to accept a pump volume.

Here the variable displacement pump 6 and the hydraulic motor 6 are connected via a closed hydraulic circuit 4, with high pressure in the connection line in the direction of flow from the variable displacement pump 8 to the hydraulic motor 6 and low pressure in the connection line from the motor 6 to the variable displacement pump 8.

The position of the control piston 12 in FIG. 1, deflected on a first side within the control cylinder 11, shows the situation in which there is no input or control signal acting on an actuator 14 and the actuator 14 is therefore not exerting any force on the control piston.

The deflection of the control piston 12 on a first side in the control cylinder 11 is therefore carried out by a preload element 16 which takes effect in the preferred embodiment shown in FIG. 1 on the side of the control cylinder 12 opposite to the actuator 14 and takes the form of a compression spring, for example. The preload element 16 shifts the control piston 12 into a deflected position so that hydraulic pressure is applied to the servo line 22 from the feed pump 60 and the servo piston 32 is shifted towards the second side 35 of the servo control device 30 by means of pressurization of the first side 33 of the servo control device 30, thereby deflecting the variable displacement pump 8 via the deflection device 36. The hydraulic fluid volume displaced by the servo piston 32 on the second side 35 of the servo control unit 30 is directed by the second servo line 24 via the second side of the control piston 12 to a discharge line 20, which in turn conducts the drive fluid to a drive fluid reservoir. In the preferred embodiment shown, this drive fluid reservoir takes the form of a tank 43.

In its deflected position according to FIG. 1 there is a displacement volume in the variable displacement pump 8, meaning there is high pressure in the connection line from the variable displacement pump 8 to the hydraulic motor 6 which drives the hydraulic motor 6. In this connection line between the variable displacement pump 8 and the hydraulic motor 6 there is a return line 25 for operating pressure which returns operating pressure to the first side of the control piston 12. In the operating situation shown the operating pressure is at high pressure. The returned operating pressure acts on the first front side of the control piston 12, exerting a force on the control piston 12 which acts against the preload element 16. As a result of this counterforce to the preload element 16, the control piston 12 is maintained in a balance of forces at a defined deflected position which adjusts automatically according to the level of operating pressure. At the same time, the returned operating pressure limits the deflected position caused by the preload element 16.

For example, if the operating pressure increases due to an increase in drive speed of the variable displacement pump 8, the operating pressure shifts the control piston 12 towards neutral position by means of its force acting on the first front side, i.e. towards the second side in the control cylinder 11, thereby reducing the pressure in servo line 22. As a result, the pressure acting on the first side 33 of the servo control unit 30 is reduced. Elastic elements 34 guide the servo piston in its deflection back towards its zero position, and the deflection device 36 withdraws the variable displacement pump 8 in its deflection. When the variable displacement pump 8 is withdrawn in its deflection, its displacement volume and therefore the pump pressure or operating pressure generated is reduced, thereby diminishing the force exerted on the first front side of the control piston 12, via the return line 25, with the control piston 12 being moved by the preload element 16 back into a further deflected position on the first side in the control cylinder. The control circuit is closed in this way. The level of power supply set at the control device is thus maintained at a constant level or regulated to a constant value, namely that defined by the control device 10.

Together with the return line 25, the preload element 16 forms a control circuit which also avoids overload of the hydrostatic drive 2. Here it can be seen that the position of the control piston 12 in the control cylinder 11 can be adjusted via the preload element 16 and the operating pressure generated by the variable displacement pump 8 when there is no input signal acting on the actuator 14. For this purpose, the preload element 16 is preferably adjustable in its preload force. The greater the preload force, the higher the level of output available at the hydraulic motor to drive a consumer 50 if there is no input signal at the actuator 14.

If for example the hydraulic motor 6 is to drive a fan 50 as a consumer, it is possible to ensure an emergency function in this way in case of failure of the electrical system, for example, so that the fan 50 continues to provide sufficient cooling for the combustion engine 3 while the combustion engine 3 is running.

The preferred embodiment described here for a fan can be by analogy applied directly to other consumers such as an air conditioning system or an alternator to generate electrical power in a vehicle. If there is no control signal at the actuator 14, which is preferably a proportional magnet to generate a counterforce to the preload element 16, that is to say equal to zero, the power supplied by the hydraulic motor 6 should not exceed a predefined maximum level. In another exemplary embodiment this corresponds to the optimum operating point of the hydraulic motor. Here the level of hydrostatic drive power capable of being supplied by the hydraulic motor 6 in the case of varying rotational speed of the variable displacement pump 8 is regulated to a constant level by the return of operating pressure via the return line 25 to the control piston 12 through interaction with the preload element 16. Changes to the rotational speed of the variable displacement pump 8 which bring about a change in supply pressure, i.e. operating pressure, when the deflection of the variable displacement pump 8 remains the same, are returned to the control piston 12 via return line 25 for operating pressure, thereby balancing out the change in supply pressure of the variable displacement pump 8 through interaction with the preload element 16. This ensures that at hydraulic motor 6, which at its simplest takes the form of a fixed displacement motor, the flow rate at the variable displacement pump 8 is always the same, with fluctuations in supply pressure being compensated by adjustment of the displacement volume of the variable displacement pump 8.

If the drive power of the hydraulic motor 6 is to be reduced for a consumer 50—the assumption in following is that the drive speed for the variable displacement pump 8 remains constant—the displacement volume of the variable displacement pump 8 has to be reduced, i.e. the deflection device 36 has to withdraw the deflection of the variable displacement pump 8. This means that the servo piston 32 has to be returned from a deflected position towards a zero position, which can only be effected by means of changes in pressure on the first and second side 33 and 35 of the servo control unit 30.

Based on the operating situation of the hydrostatic drive 2 in FIG. 1, this can be achieved by means of relieving pressure in the servo line 22, for which purpose the servo piston 12 has to be shifted towards the second side in servo cylinder 11. This shift can be carried out by means of an actuator 14, which should preferably take the form of a proportional magnet 14. For this purpose an input signal or control signal can be applied to the actuator 14, causing—in the case of a proportional magnet a force to be exerted by the actuator 14 on the control piston 12 against the preload element 16. In this operating situation in which the input signal at actuator 14 is larger than zero but smaller than the magnitude of the counteracting force being exerted by the preload element 16, the control piston is moved towards the second side in control cylinder 11 by the sum of the forces exerted by the operating pressure and the actuator 14.

If there is an increase in the force exerted by the actuator 14 against the direction of force of the preload element 16, the deflection of control piston 12 in control cylinder 11, shown in FIG. 1, is withdrawn, thereby reducing the size of the aperture cross-section for the feed line 18 to the servo pressure line 22 and thus diminishing the pressure in the servo pressure line 22. As a result, the pressure is also reduced on the first side 33 of the servo control device 30 and the deflection device 36 withdraws the deflection of the variable displacement pump 8—due to the withdrawal of the deflection of the servo piston 32 via the servo springs.

As explained for the operating situation with the input signal at actuator 14 equal to zero, the desired operating situation with an input signal greater than zero is likewise maintained by the control circuit consisting of the return line 25 and the preload element 16. Assuming a constant input signal for the actuator 14, fluctuations in the flow rate of the variable displacement pump 8 are balanced out via the return of operating pressure. In this way, the input signal exerting a certain force in the actuator 14 can be used to define a reference value for a constant level of drive power available at hydraulic motor 6. If the flow rate of variable displacement pump 8 fluctuates, stabilization of the power available at hydraulic motor 6 is automatically effected by the control device 10 in that it applies the returned operating pressure through interaction with the preload element 16 to control the flow rate or deflection of the variable displacement pump 8 in such a way that the hydraulic power arriving at hydraulic motor remains constant.

In the above description of an initial preferred embodiment of the control device according to the invention for a hydrostatic drive, the actuator force was assumed to be equal to or greater than zero but of lesser magnitude than the force exerted by the preload element 16 on the control cylinder 12. If the amount of actuator force is exactly the same as the force exerted by preload element 16 on control piston 12, though with reversed signs, control piston 12 is located in a neutral position, i.e. it is in an approximately central alignment between the first and second side in control cylinder 11. In this neutral position, not shown in these figures, in which the control piston 12 is not deflected to either one or the other side in control cylinder 11, control piston 12 opens each of the lines 18 for drive fluid and the discharge lines 20 for drive fluid in their cross-section to such an extent the pressure levels in servo lines 22 and 24 are balanced. The control piston 12 is only purely theoretically located in the geometrical center of the control cylinder 11, since in practice both the control piston 12 and the control cylinder 11 are manufactured with a measure of tolerance. The neutral position is reached when the rates of flow through the respective feed and discharge lines 18 and 20 are equal. When the two servo lines 22 and 24 are at equalized pressure, the first and second side 33 and 35 of the servo control device 30 are also at equalized pressure, causing the elastic elements 34 of the servo control device 30 to move the servo piston 32 into a zero position. When the servo piston is in zero position, the deflection device 36 for the variable displacement pump 8 is also in zero position, meaning that the variable displacement pump 8 is likewise in zero position and has no displacement volume. In the case of an axial piston pump of swashplate type as the variable displacement pump 8, the swashplate in this position is vertical to the rotational axis of the axial piston pump, meaning that no relative movement of the axial pistons can take place vis-à-vis their respective cylinders in the cylinder block. However, the variable displacement pump 8 can be rotary driven by a combustion engine in this position, for example, and, triggered by the control device 10, can generate a displacement volume in one or the other direction of flow by deflection of the servo control device 30 caused by deflection of the deflection device 36.

There are two ways in which the control device for hydrostatic drives, according to the invention, can deflect the variable displacement pump 8 from its zero position, in which the servo piston 32 is in a zero position and the control piston 12 is in a zero position:
(i) Reduction of the force of the actuator 14 so that the control piston 12 is shifted by the elastic preload element 16 onto one side in the control cylinder 11, or
(ii) Increase of the force of actuator 14 so that the actuator develops a force of greater magnitude than that of the preload element 16, causing the control piston 12 to be shifted to a second side in the control cylinder 11 (not shown in the figures).

In the deflected side on the second side in the control cylinder 11, the control cylinder opens the feed line 18 for drive fluid for the second servo line 24, at the same time opening the discharge 20 for drive fluid on the first side via the first servo line 22, so as to be able to discharge displaced drive fluid from the first side 33 of the servo control device 30. If the feed line 18 for the second servo pressure line 24 is opened, the pressure of the second servo line 24 increases as it does logically on the second side 35 of the servo control device 30, thereby shifting the servo piston 32 towards the first side 33 of the servo control device. In the preferred embodiment described, the displaced drive fluid is discharged by servo line 22 via the control cylinder 11 into a tank 43.

By shifting the servo piston 32 in the servo control device 30 to a second side 35 in the servo cylinder, the deflection device 36 of the variable displacement pump 8 is deflected to a second side and the variable displacement pump 8 is deflected the other way round as compared to the situation with an input signal smaller than the magnitude of the force of the preload element 16. In this situation the variable displacement pump 8 exhibits a different direction of drive fluid flow, meaning that the high pressure side in the closed hydraulic circuit 4 changes as compared to the previously described operating situation and the hydraulic motor 6 can be operated in its other rotational direction. This means, for example, that in the case of a fan drive, the fan 50 can perform a blow-out function by which the fan 50 blows out warm air from the engine cornpartment into the environment, for example.

In order to move the control piston 12 from its neutral position into a second position in which the magnitude of the actuator force is greater than the force of the preload element 16, it will preferably first be necessary to overcome a compressive force deriving from returned pressure from the servo line 24 and the preload force of the preload element 16. A second return line 26 to return the servo pressure in the second servo line 24 serves to generate increased resistance for the deflection of the control piston 12 from neutral position towards the second side of the control cylinder 11.

In this way, the neutral position of the control piston 12 can be maintained more effectively so that even the smallest changes in the actuator force cause the control piston 12 to be shifted and therefore the variable displacement pump 8 to be adjusted. When the control piston 12 is deflected in both the one direction and the other direction, hydraulic pressure is applied to one of the respective front sides of the control piston 12 which attempts to keep the control piston in neutral position. In this way, these two hydraulic pressures create an artificial deadband in which the hydraulic pressures center the control piston 12 in its neutral position. Here again, the neutral position of the control piston 12 in control cylinder 11 is that in which the rates of flow through the feed and discharge lines 18 and 20 to the respective servo lines 22 and 24 are at an equal level, so that the pressure levels on the two sides of the servo control device 33 and 35 are equalized. Secure maintenance of the control piston 12 in the neutral position, in which the supply pump 8 has no displacement volume since the servo piston 32 and the deflection device 36 are in their respective zero positions, is particularly important in hydrostatic drives so as to be able to reliably set the vehicle to standstill. This is particularly important for the operation of a hydrostatic propulsion drive unit for safety-related reasons.

In order to limit the hydraulic pressure in the second return line 27, a bypass line 28 can be provided to directly connect a second return line 27 to the discharge line 20. Preferably, an additional nozzle 29 is provided in the bypass line 28 which allows an appropriate dynamic pressure so as to permit the artificial deadband to be created and compensate for the pressure levels in the second return line 27 and the discharge line 20.

With a known force exerted by the preload element on the control piston 12—defined as part of the design of the hydrostatic drive—it is therefore possible to set the neutral position simply and reliably by means of the control device 10 for hydrostatic drives 2 according to the invention by selecting the value of the input signal acting on the actuator 14 such that the actuator 14 builds up an equivalent counterforce to the preload element 16. Whether the hydrostatic drive 2 is operated in the one or the other direction by means of reversible operation of the variable displacement pump 8, specification of the input signal at the actuator 14 can cause a constant level of drive power to be available at the hydrostatic motor 6. To this end, the input signal at the actuator 14 merely has to be reduced or increased as appropriate so that the preload element 16 or the sum of forces from the actuator 14 and the operating pressure can move the control piston 12 from its neutral position into a desired (deflected) position in which it is maintained by means of automatic regulatory control via the hydraulic forces at the front sides. It is also appropriate to provide a nozzle 27 in the return line 26 of the servo pressure line 24 so as to reduce pressure from the servo line 24 so that the control pressure generated by the feed pump does not counteract at full strength—combined with the force of the preload element 26—the shifting of the control piston 12 in the direction of the second side in the control cylinder 11.

Figure 2:
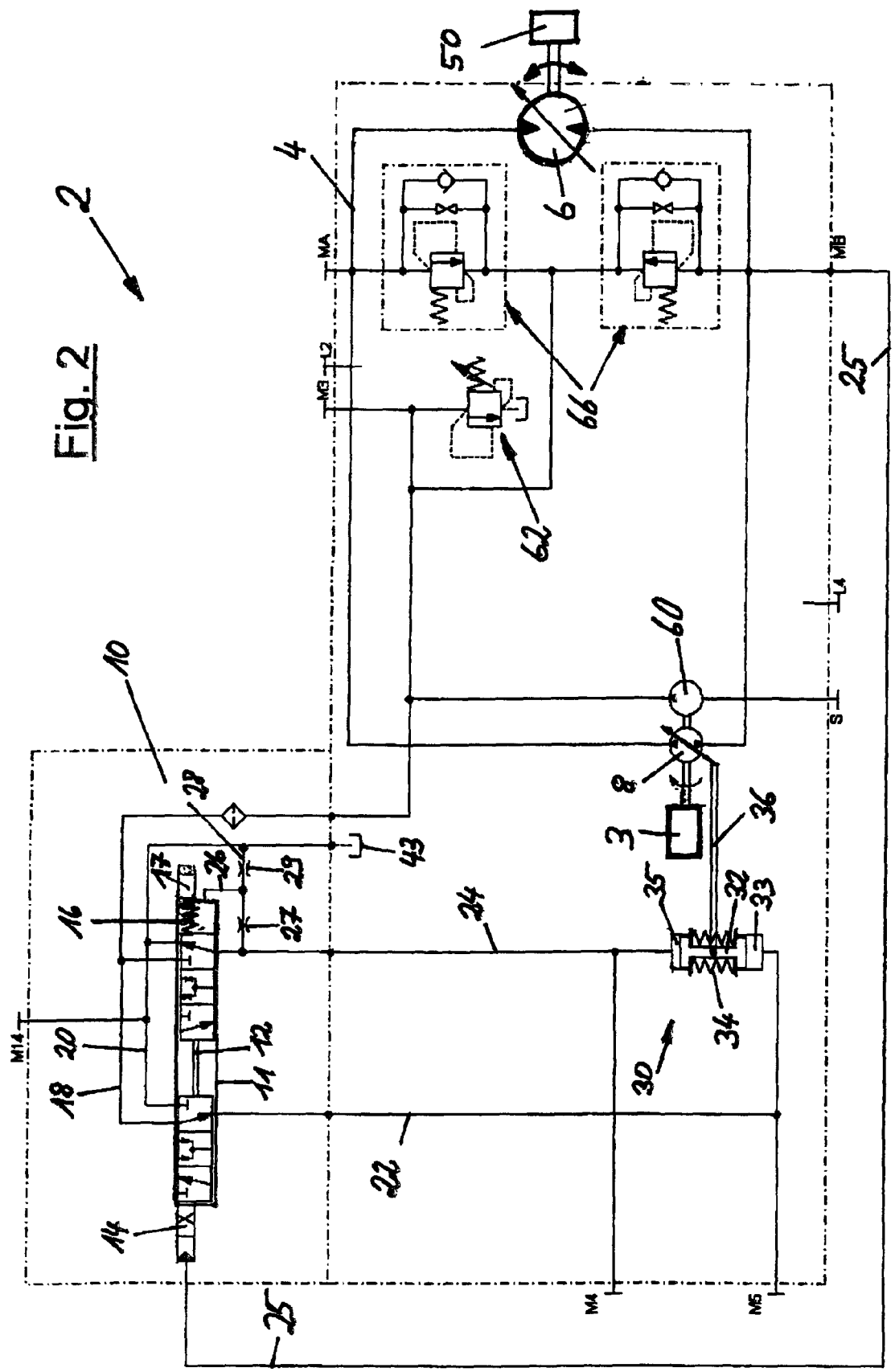
FIG. 2 A second embodiment in diagrammatic form with a control signal equal to zero.

FIG. 2 shows another preferred embodiment of a control device 10 for a hydrostatic drive 2 according to the invention. In contrast to the preferred embodiment according to FIG. 1, the operating pressure via return line 25 is not fed directly to a front side of the control piston 12 but acts indirectly on the control piston 12 via a bore in the actuator 14. A coaxial bore is preferably provided at the actuator 12 for this purpose. Here, operating pressure fed back via the return line 25 from the high-pressure side of the closed hydraulic circuit 4 can act on an actuator element that is shiftable longitudinally along the control cylinder axis or directed to a front side of the control piston 12 by the actuator 14. The remaining configuration of the preferred embodiment according to FIG. 2 is the same as the preferred embodiment according to FIG. 1.

Figure 3:
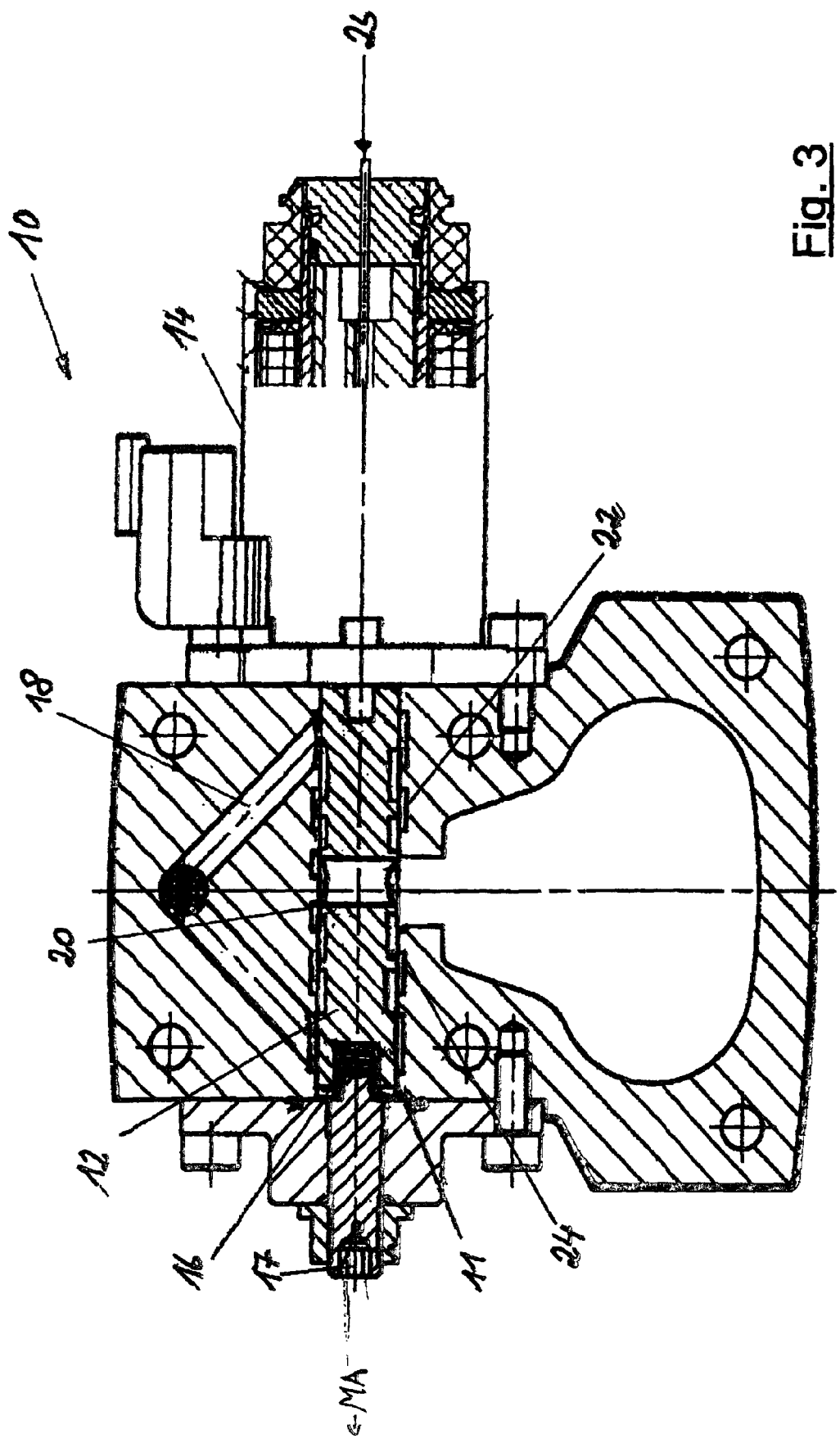
FIG. 3 A control device according to the invention in diagrammatic form.

FIG. 3 provides a detailed view of the control device 10 in which a control piston 12 is positioned in the control cylinder 11 in such a way that is deflected from neutral position. Here the control piston 12 is maintained in a deflected position by means of a preload element 16 which is adjustable in its preload force by means of an adjustment device 17 and by the operating pressure coming from the return line 25 combined with the force exerted by the actuator 14. As can be seen from FIG. 3, the feed line 18 for hydraulic fluid under control pressure on the right-hand side as shown in FIG. 3 is connected to the servo line 22 so that there is increased pressure in servo line 22. On the left-hand side of the control piston as shown in FIG. 3, the servo line 24 is connected to the discharge line 20 so that drive fluid displaced via servo line 24 and discharge line 20 by the servo piston due to the increased pressure in servo line 22 can be discharged to a tank 43, for example.

The reference numerals correspond to those used in FIGS. 1 and 2 for the same components.

If one imagines the control piston 12 were to be shifted in the plane of the drawing of FIG. 3 to the left, it can be seen that the control piston, before being hydraulically maintained on the left-hand side for example, is initially moved into its neutral position in which the flow rates from the feed line 18 to the servo lines 22 and 24 as well as the discharge lines 20 from the servo lines 24 and 22 are equal in their cross-section size, causing the pressure levels in the servo lines 22 and 24 to be balanced, too. The servo piston 32 and the hydraulic pump 8 which it can adjust are then in a zero position. In a further deflection of the control piston 12 onto the left-hand side in the control cylinder 11 as shown in FIG. 3, the servo line 24 becomes a feed line 18 for drive fluid to the servo control device 30 and the servo line 22 becomes a discharge line 20 for drive fluid coming from the servo control 30. The pressure levels at the servo control are thus interchanged as compared to the operating situation or control piston position shown in FIG. 3, whereby the servo piston in the servo control device 30 is shifted to the other side, thereby reversing the variable displacement pump 8 in its direction of flow by means of the deflection element 36, for example a swashplate.

In its position shifted to the right as shown in FIG. 3, the control piston 12 is maintained in a balance of forces by the preload element 16 via the actuator 14, through interaction with the operating pressure supplied via the return line 25, which in the preferred embodiment shown in FIG. 3 corresponds to that of FIG. 2. Here the forces from the preload element 16 and the compressive force from the operating pressure interact to regulate or precisely position the control piston 12 in its position deflected to the right as shown in FIG. 3. In this case, the force generated by the actuator 14 constitutes the output value that can be specified for self-regulation.

In this way, the control device 10 for a hydrostatic drive 2 according to the invention provides a constant level of hydraulic power from the drive speed of the variable displacement pump 8, thereby achieving constant mechanical power delivery to a consumer 50 subject to automatic regulation. The output value to be maintained at a constant level, to be supplied by the hydrostatic drive to a consumer, can be preset via an input signal which exerts an actuator force at the actuator 14.

Figure 4:
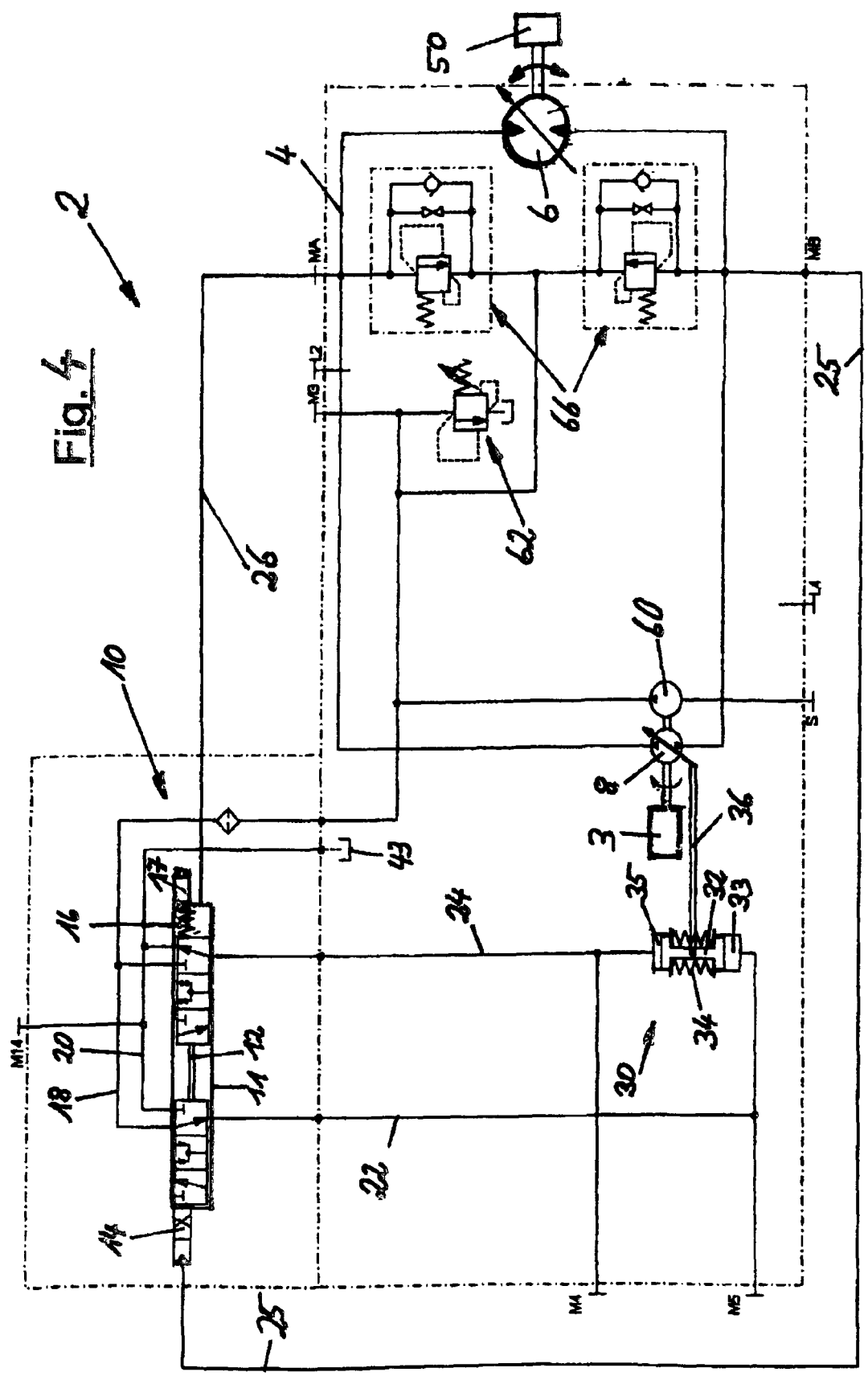
FIG. 4 A third embodiment in diagrammatic form with a control signal equal to zero.

Such a preset value can be achieved both in reversed and in non-reversed operation of the hydraulic drive according to the invention by means of a constant force exerted by the actuator 14 on the control piston 12. In a further preferred embodiment shown in FIG. 4, the second return line 26 is linked to the connection line between the variable displacement pump 8 and the hydraulic motor 6 for this purpose, forming the high-pressure line in reversed operation. This means that in reversed operation, too, a load-dependent adjustment of the hydraulic pump 8 is achieved, since the returned high pressure in reversed operation generates a force which counters the actuator 14 on the front side of the control piston 12, on which the preload element 16 is also acting. In this preferred embodiment shown in FIG. 4, it is no longer necessary to return the control pressure onto the right-hand side of the control device 10 as was shown in FIGS. 1 and 2. The low pressure in non-reversed "normal operation" is sufficient to provide any damping that might be required in returning the control piston 12 from its position deflected to the left as shown in FIGS. 1, 2 and 4 towards a less deflected position towards neutral position. With the connection—according to the invention—of one side of the control device 10 or the control piston 12 to a connection line between the variable displacement pump 8 and the hydraulic motor 6, the high pressure can be efficiently and automatically applied as a regulatory control parameter to maintain the power available at the hydraulic motor 6 at a constant level, either in reversed or non-reversed normal operation, depending on the mode of operation.

By means of the load-dependent return of high pressure, either via the first return line 25 in non-reversed normal operation or, according to FIG. 4, via the second return line 26 in reversed operation, the control piston 12 can be maintained in a balanced position, deflected to the left or right, by means of the high pressure applied to a front side of the control piston 12. Here the high pressure in the first return line 25 or in the second return line 26 regulates the displacement volume of the variable displacement pump 8 in such a way that in the case of a fluctuation in rotational speed of the prime mover 3 and thus of the variable displacement pump 8, the hydraulic power supplied to the hydraulic motor 6 remains constant. In a neutral position of the control piston 12, the two return lines 25 and 26 are free of pressure, since the variable displacement pump 8 does not displace any hydraulic fluid, because the servo piston 32 is likewise without pressure in zero position and therefore the deflection device 36 of the hydraulic pump 8 is in zero position and the variable displacement pump 8 is not deflected.

Furthermore, the control device 10 according to the invention meets the requirements for emergency running properties to protect the hydrostatic drive from overload in the case of failure of the electrical system which is, among other things, responsible for generating the actuator force. In this case the control piston 12 is moved by the preload element 16 against the operating pressure into a position shifted to the right in the control cylinder 11 as shown in FIG. 3, with the operating pressure constituting the limiting factor for shifting the control piston 12 by the preload element 16. All in all, the control device 10 for hydrostatic drives according to the invention provides a simple but robust and reliable, self-regulating control device 10 which is simple in structure and inexpensive to manufacture. The device also makes it possible to dispense entirely with elaborate safety mechanisms such as pressure relief valves or zero-stroke valves to limit the high pressure in the closed hydraulic circuit 4. In the event of increasing operating pressure on the high-pressure side of the closed hydraulic circuit, the displacement volume of the variable displacement pump 8 is withdrawn by means of withdrawal of the deflection of the variable displacement pump 8.

REFERENCE NUMERALS LIST

2 Hydrostatic drive
3 Prime mover
4 Closed hydraulic circuit
6 Hydraulic motor
8 Variable displacement pump
10 Control device 11 Control cylinder
12 Control piston
14 Actuator
16 Preload element
17 Adjustment device for preload element
18 Feed line
20 Discharge lines for hydraulic fluid
22 First servo line
24 Second servo line
25 First return line for operating pressure
26 Second return line for operating pressure
27 Nozzle
28 Bypass line
29 Nozzle
30 Servo control unit
32 Servo piston
33 First side of servo control unit
34 Elastic elements
35 Second side of servo control unit
36 Displacement device
43 Tank
50 Consumer/Fan
60 Charge pump
62 Pressure limiting valve for charge pressure
66 Pressure limiting valve for operating pressure

What is claimed:

1. Hydrostatic drive (2) with a closed hydraulic fluid circuit (4), in which there is a hydraulic motor (6) and a variable displacement pump (8), with a feed pump to provide drive fluid (60) under control pressure, and with a control device (10) for the regulated application of control pressure to a double-sided servo control unit (30) of the variable displacement pump (8), whereby the control device (10) comprises:
 a control piston (12) guided in a double-sided control cylinder (11) with a first side and a second side which can be moved from a neutral position in both directions along the longitudinal axis of the control cylinder (11) in such a way that the control piston (12) opens a feed line (18) for drive fluid under control pressure to one side (33, 35) of the servo control unit (30) while, at the same time, opening a discharge line (20) for discharging fluid via the other side of the control piston (12) from the second side (33, 35) of the servo control unit (30) to a drive fluid reservoir (43);
 an actuator (14) at the first side of the control cylinder (11) by means of which a force can be exerted towards the second side of the control cylinder (11) onto the control piston (12);
 only one preload element (16) which acts on the opposite second side of control piston (12) deflecting the control piston (12) on the first side of the control cylinder (11), if the actuator (14) exerts no force on the control piston (12); and
 characterized in that a first return line (25) directly connected between the variable displacement pump (8) and a first side of the control piston (12) such that hydraulic fluid under operating pressure generated by the variable displacement pump (8) can be returned via the first return line (25) to the first side of the control piston (12) in such a way that a force can only be exerted in the effective direction of the actuator (14) onto the control piston (12), and that, when the actuator (14) is at constant force, the control piston (12) is maintained by the preload element (16) and the supply pressure of the variable displacement pump (8) in a force-balanced position in the control cylinder (11) so that the hydraulic motor (6) is regulated at a constant hydraulic output dependent on the force of the actuator (14) when the rotational speed of the variable displacement pump (8) fluctuates.

2. Hydrostatic drive according to claim 1 in which the control piston (12) can be positioned in a maximum deflectable position when the actuator (14) is inactive.

3. Hydrostatic drive according to claim 1 in which the preload force of the preload element (16) can be set.

4. Hydrostatic drive according to claim 1 in which the control piston (12) is in a neutral position when the magnitude of the force of the actuator (14) is equal to the magnitude of the force of the preload element (16).

5. Hydrostatic drive according to claim 1 in which the supply pressure of the variable displacement pump (8) is directed to a front side of the control piston (12) via a bore in the actuator (14).

6. Hydrostatic drive according to claim 1 in which the pressure in a servo line (22, 24) is returned to one side of the control piston (12) via a second return line (26) in such a way that it is possible to exert a force on the control piston in support of the preload element (16).

7. Hydrostatic drive according to claim 6 in which the second return line (26) comprises a nozzle (27) and the second return line (26) with a bypass line (28) comprising a nozzle (29) is connected to the discharge line (20) for drive fluid.

8. Hydrostatic drive according to claim 1 in which the actuator (14) is an electrically controlled proportional magnet.

9. Hydrostatic drive according to claim 1 in which the preload element (16) is a compression spring.

10. Hydrostatic drive according to claim 1 in which the variable displacement pump (8) is reversible, and/or the hydrostatic drive has an adjustable and/or reversible hydraulic motor (6) to power a consumer (50).

11. Hydrostatic drive according to claim 1 in which the variable displacement pump (8) is reversible and the high pressure generated by the variable displacement pump (8) in reversed operation can be returned to the second side of the control piston (12) via a second return line (26) in such a way that it is possible to exert a force on the control piston in support of the preload element (16).

12. Hydrostatic drive according to claim 10 characterized by the fact that the consumer (50) is a fan.

13. Hydrostatic drive (2) with a closed hydraulic fluid circuit (4), in which there is a hydraulic motor (6) and a variable displacement pump (8), with a feed pump to provide drive fluid (60) under control pressure, and with a control device (10) for the regulated application of control pressure to a double-sided servo control unit (30) of the variable displacement pump (8), whereby the control device (10) comprises:
 a control piston (12) guided in a double-sided control cylinder (11) with a first side and a second side which can be moved from a neutral position in both directions along the longitudinal axis of the control cylinder (11) in such a way that the control piston (12) opens a feed line (18) for drive fluid under control pressure to one side (33, 35) of the servo control unit (30) while, at the same time, opening a discharge line (20) for discharging fluid via the other side of the control piston (12) from the second side (33, 35) of the servo control unit (30) to a drive fluid reservoir (43);

an actuator (14) at the first side of the control cylinder (11) by means of which a force can be exerted towards the second side of the control cylinder (11) onto the control piston (12);

only one preload element (16) which acts on the opposite second side of control piston (12) deflecting the control piston (12) on the first side of the control cylinder (11), if the actuator (14) exerts no force on the control piston (12); and characterized in that a first return line (25) directly connected between the variable displacement pump (8) and a first side of the control piston (12) such that operating pressure generated by the variable displacement pump (8) is returned directly to the first side of the control piston (12) via the first return line (25) in such a way that a force can be exerted in the effective direction of the actuator (14) onto the control piston (12), and that, when the actuator (14) is at constant force, the control piston (12) is maintained by the preload element (16) and the supply pressure of the variable displacement pump (8) in a force-balanced position in the control cylinder (11) so that the hydraulic motor (6) is regulated at a constant hydraulic output dependent on the force of the actuator (14) when the rotational speed of the variable displacement pump (8) fluctuates.

14. Hydrostatic drive (2) with a closed hydraulic fluid circuit (4), in which there is a hydraulic motor (6) and a variable displacement pump (8), with a feed pump to provide drive fluid (60) under control pressure, and with a control device (10) for the regulated application of control pressure to a double-sided servo control unit (30) of the variable displacement pump (8), whereby the control device (10) comprises:

a control piston (12) guided in a double-sided control cylinder (11) with a first side and a second side which can be moved from a neutral position in both directions along the longitudinal axis of the control cylinder (11) in such a way that the control piston (12) opens a feed line (18) for drive fluid under control pressure to one side (33, 35) of the servo control unit (30) while, at the same time, opening a discharge line (20) for discharging fluid via the other side of the control piston (12) from the second side (33, 35) of the servo control unit (30) to a drive fluid reservoir (43);

an actuator (14) at the first side of the control cylinder (11) by means of which a force can be exerted towards the second side of the control cylinder (11) onto the control piston (12); only one preload element (16) which acts on the opposite second side of control piston (12) deflecting the control piston (12) on the first side of the control cylinder (11), if the actuator (14) exerts no force on the control piston (12); and characterized in that a first return line (25) directly connected between the variable displacement pump (8) and a first side of the control piston (12) such that operating pressure generated by the variable displacement pump (8) is returned to the first side of the control piston (12) via the first return line (25) in such a way that the operating pressure from the first return line (25) exerts a force on the control piston (12) such that the operating pressure acts against the preload element (16), whereby the control piston (12) is maintained in a balance of forces at a defined deflected position that adjusts automatically according to the level of the operating pressure.

15. Hydrostatic drive according to claim 14 wherein the returned operating pressure limits the deflected position caused by the preload element (16) at the same time the balance of forces is maintained on the control piston (12).

16. Hydrostatic drive according to claim 14 wherein the position of the control piston (12) is adjustable by the operating pressure returned by the first return line (25) and the preload element (16) without a control signal.

17. Hydrostatic drive according to claim 14 whereby the operating pressure generated by the variable displacement pump (8) and returned to the first side of the control piston (12) via a first return line (25) and the preload element (16) ensure drive power is available in the absence of a control signal.

* * * * *